US005739882A

United States Patent [19]
Shimizu et al.

[11] Patent Number: 5,739,882
[45] Date of Patent: Apr. 14, 1998

[54] LCD POLYMERIZED COLUMN SPACER FORMED ON A MODIFIED SUBSTRATE, FROM AN ACRYLIC RESIN, ON A SURFACE HAVING HYDROPHILIC AND HYDROPHOBIC PORTIONS, OR AT REGULAR SPACINGS

[75] Inventors: Michio Shimizu, Chiba; Toshimitsu Konuma; Takeshi Nishi, both of Kanagawa, all of Japan

[73] Assignee: Semiconductor Energy Laboratory Co., Ltd., Kanagawa, Japan

[21] Appl. No.: 246,241

[22] Filed: May 19, 1994

Related U.S. Application Data

[63] Continuation-in-part of Ser. No. 207,125, Mar. 8, 1994, Pat. No. 5,490,001, which is a continuation-in-part of Ser. No. 793,539, Nov. 18, 1991, Pat. No. 5,305,127.

[30] Foreign Application Priority Data

| May 20, 1993 | [JP] | Japan | 5-177195 |
| May 21, 1993 | [JP] | Japan | 5-142884 |
| May 24, 1993 | [JP] | Japan | 5-144303 |
| May 27, 1993 | [JP] | Japan | 5-148544 |

[51] Int. Cl.$^6$ .................... G02F 1/1337; G02F 1/1339
[52] U.S. Cl. .................... 349/123; 349/124; 349/153; 349/155; 349/156
[58] Field of Search .................... 359/62, 80, 81, 359/51, 52, 74; 349/86, 92, 93, 94, 123, 153, 155, 156, 124

[56] References Cited

U.S. PATENT DOCUMENTS

| 3,807,833 | 4/1974 | Graham et al. ............ 359/81 |
| 4,139,273 | 2/1979 | Crossland et al. |

(List continued on next page.)

FOREIGN PATENT DOCUMENTS

| 58-33218 | 2/1983 | Japan ............ 359/80 |
| 62-299815 | 12/1987 | Japan ............ 359/76 |
| 1-265231 | 10/1989 | Japan ............ 359/80 |
| 0139522 | 5/1990 | Japan ............ 359/73 |
| 32833 | 1/1991 | Japan ............ 359/81 |
| 3-246521 | 11/1991 | Japan ............ 359/81 |
| 4-40415 | 2/1992 | Japan ............ 359/62 |

OTHER PUBLICATIONS

Coates et al., "Electrically Induced Scattering Textures in Smectic A Phases and Their Electric Reversal", J. Phys. D: Appl. Phys., vol. 11 1978, pp. 2025–2034.

Iwasaki et al., "Colour Switching in Ferroelectric Smectic Liquid Crystal by Electric Field", JPN. J. Appl. Phys. vol. 18, No. 12, 1979, pp. 2323–2324.

Coates et al., "A Variable Tilt Smectic A Electro–optic Effect Giving Stoved Colours", Mol. Cryst. Liq. Cryst. vol. 41, 1978, pp. 151–154.

Primary Examiner—William L. Sikes
Assistant Examiner—Walter J. Malinowski
Attorney, Agent, or Firm—Sixbey, Friedman, Leedom & Ferguson; Gerald J. Ferguson; Jeffrey L. Costellia

[57] ABSTRACT

A liquid crystal electro-optical device is fabricated by holding a mixture of a liquid crystal material and an uncured resin between a pair of substrates, precipitating the uncured resin from the mixture in the form of columns, and curing the thus precipitated columns of uncured resin, wherein a ultraviolet-curable resin is used as the sealing material and the uncured resin to cure the both by irradiating an ultraviolet radiation thereto. In this manner, the curing of the sealing material and the resin columns can be completed in a single process. Also, in a liquid crystal electro-optical device comprising a pair of substrates in which one of them is a light-transmitting substrate, a fabricating process comprises precipitating an uncured resin from a mixture of a liquid crystal material and a resin curable by either or both of ultraviolet radiation and heating, and curing the precipitated resin by irradiating an ultraviolet radiation and heating. Furthermore, the surface state of the plane of at least one of the substrates to be in contact with the liquid crystal mixture is partially modified or rendered hydrophobic and/or hydrophilic to control the precipitation position of the resin.

30 Claims, 6 Drawing Sheets

U.S. PATENT DOCUMENTS

| | | |
|---|---|---|
| 4,662,721 | 5/1987 | Harada et al. . |
| 4,673,255 | 6/1987 | West et al. ................................. 359/51 |
| 4,775,225 | 10/1988 | Tsuboyama et al. ..................... 359/81 |
| 4,791,418 | 12/1988 | Kawahara et al. ........................ 359/48 |
| 4,834,510 | 5/1989 | Fujita . |
| 4,924,215 | 5/1990 | Nelson . |
| 4,924,243 | 5/1990 | Sato et al. ................................. 359/81 |
| 4,950,052 | 8/1990 | Fergason et al. ......................... 359/93 |
| 5,046,830 | 9/1991 | Nakanowatari . |
| 5,150,231 | 9/1992 | Iwamoto et al. .......................... 359/44 |
| 5,189,540 | 2/1993 | Nakamura et al. ..................... 359/102 |
| 5,204,763 | 4/1993 | Hikmet ...................................... 359/51 |
| 5,258,865 | 11/1993 | Konuma . |
| 5,268,782 | 12/1993 | Wenz et al. ............................... 359/81 |
| 5,268,783 | 12/1993 | Yoshinaga et al. ..................... 359/103 |
| 5,299,289 | 3/1994 | Omae et al. ............................... 359/95 |
| 5,305,126 | 4/1994 | Kobayashi et al. ....................... 359/51 |
| 5,305,127 | 4/1994 | Konuma . |
| 5,321,533 | 6/1994 | Kumar ....................................... 359/51 |
| 5,327,271 | 7/1994 | Takeuchi et al. .......................... 359/51 |
| 5,333,074 | 7/1994 | Hikmet ...................................... 359/51 |
| 5,357,356 | 10/1994 | Konuma et al. ........................... 359/52 |
| 5,361,152 | 11/1994 | Harada et al. ............................. 359/81 |
| 5,381,256 | 1/1995 | Hanyu et al. .............................. 359/75 |
| 5,387,445 | 2/1995 | Horiuchi et al. ............................ 428/1 |
| 5,450,220 | 9/1995 | Onishi et al. .............................. 359/51 |
| 5,473,450 | 12/1995 | Yamada et al. ........................... 359/51 |
| 5,490,001 | 2/1996 | Konuma .................................... 359/81 |

RUBBING DIRECTION

LCD POLYMERIZED COLUMN SPACER FORMED ON A MODIFIED SUBSTRATE, FROM AN ACRYLIC RESIN, ON A SURFACE HAVING HYDROPHILIC AND HYDROPHOBIC PORTIONS, OR AT REGULAR SPACINGS

This application is a continuation-in-part of Ser. No. 207,125, filed on Mar. 8, 1994, now U.S. Pat. No. 5,490,001 on Feb. 6, 1996; which is a continuation-in-part of Ser. No. 793,539, filed Nov. 18, 1991, now U.S. Pat. No. 5,305,127.

BACKGROUND OF THE INVENTION

1. Field of the Invention

The present invention relates to a liquid crystal electro-optical device comprising a liquid crystal cell whose spacing between the substrates is maintained constant by resin columns, wherein the resin columns are formed by precipitating an uncured resin from a mixture of a liquid crystal material and the uncured resin and curing the precipitated uncured resin.

2. Background of the Related Art

In a liquid crystal cell of a device such as a liquid crystal electro-optical device, the spacing between the substrates in the cell is generally maintained constant by sparsely distributing silicon oxide spheres about several micrometers in diameter as spacers between the substrates. The spacers are thus held between the substrates to maintain the distance between the substrates at a constant value. The distance is determined by the diameter of the spacers. The spacers assure the minimum spacing between the substrates; i.e., they prevent a decrease in distance between the substrates from occurring. However, they cannot prevent the substrates from being separated apart from each other, i.e., the increase in distance between the substrates.

Liquid crystal displays having a large image display area have recently been attracting much attention. However, the increase in the area of a liquid crystal cell generally produces the distortion of the substrates constituting the cell. In case of using a ferroelectric liquid crystal as the liquid crystal material, for instance, the layer structure of the ferroelectric liquid crystal tends to be destroyed due to the deformation of the substrate. Thus, even when spacers are used for maintaining the spacing between the substrates constant, a liquid crystal display having a large image display area using a ferroelectric liquid crystal is unfeasible because the display experiences disturbances. This problem occurs in the liquid crystal displays using not only ferroelectric liquid crystals but also any kind of liquid crystal materials. To avoid this problem, in addition to the spacers, adhesive materials (scattered in a liquid crystal cell) based on an organic resin for fixing the spacing between the substrates is used. These types of organic resin adhesives are provided as spheres larger than the spacing between the substrates so that they may deform and tightly adhere one substrate to the other upon applying pressure thereto. However, the use of such adhesive materials is also problematic in that the orientation of the liquid crystal molecules becomes disturbed in the vicinity of the adhesive material.

Liquid crystal cells have been fabricated conventionally by a process which comprises: subjecting a substrate to orientation treatment; scattering the aforementioned spacers and internal adhesive materials on one of the substrates; adhering the substrates each other to control the spacing between the substrates; and injecting the liquid crystal material between the substrates.

The liquid crystal molecules are oriented according to the orientation force. However, in fabricating a liquid crystal cell according to the prior art process, the change in the state of the liquid crystal orientation has been often disturbed by the resin materials for tightly adhering one substrate to the other.

SUMMARY OF THE INVENTION

An object of the present invention is to simplify the fabrication process of a liquid crystal device and to shorten the process time.

Thus, an embodiment according to the present invention provides a process for fabricating a liquid crystal electro-optical device, which comprises: forming a sealing material on the periphery of a first substrate; dropping a mixture of a liquid crystal material and an uncured resin on the surface of the first substrate; adhering a second substrate to the surface of the first substrate on which the mixture is dropped; precipitating the uncured resin from the mixture; and curing the sealing material and the precipitated uncured resin.

In the process for fabricating a liquid crystal electro-optical device according to the present invention, a ultraviolet-curable (UV-curable) resin is used as the sealing material and the uncured resin. In other words, the sealing material and the uncured resin are cured by UV radiation. More briefly, the process according to an embodiment of the present invention comprises curing, in a single process, the sealing material provided on the periphery of the substrate and the uncured resin precipitated from the mixture in the form of columns.

Another object of the present invention is to provide a liquid crystal electro-optical device having a light-transmitting film, in which the resin columns of the light shield film portion are cured to prevent the reduction of mechanical strength and operation characteristics on the device.

The process according to another embodiment of the present invention comprises precipitating an uncured resin from a mixture held between a pair of substrates and comprising a liquid crystal material and an uncured resin, provided that one of the pair of substrates has a light shield film, and that the uncured resin is curable using UV radiation or heat. Accordingly, the precipitated uncured resin is cured by UV radiation or heating. Specifically, an acrylic modified epoxy resin is used as the resin capable of being cured by UV radiation or heating. In short, the process according to another embodiment of the present invention comprises using an acrylic modified epoxy resin which is curable by UV radiation or heating, as resin column, and curing the resin of the element portion mainly by heating, while curing the resin of the rest of the portions by UV radiation, because the element portion comprises a light shield film to cut off light for curing the resin.

Still another object according to the present invention is, to precipitate the uncured resin at a desired position in a process for fabricating a liquid crystal electro-optical device comprising resin columns obtained by precipitating an uncured resin from a mixture of a liquid crystal material and the uncured resin wherein the precipitated uncured resin is cured in the form of columns.

Thus, the process according to still another embodiment of the present invention comprises holding a mixture of a liquid crystal material and an uncured resin between a pair of substrates, precipitating the uncured resin from the mixture in the form of columns, and curing the precipitated uncured resin, wherein a part of the surface (which is in contact with the mixture) of at least one of the pair of the substrates is modified to control the site for precipitating the uncured resin. Furthermore, a yet another embodiment according to the present invention comprises holding a mixture of a liquid crystal material and an uncured resin between a pair of substrates, precipitating the uncured resin from the mixture in the form of columns, and curing the precipitated cured resin, wherein a hydrophobic and/or hydrophilic portion are/is provided selectively on portions of the surface (which is in contact with the mixture) of at least one substrate. The site for precipitating the uncured resin is controlled by thus changing the surface state of selected portions.

DETAILED DESCRIPTION OF THE PREFERRED EMBODIMENTS

The present invention is illustrated in greater detail referring to non-limiting examples below and to the attached figures. It should be understood, however, that the present invention is not to be construed as being limited thereto.

Embodiment 1

The process for fabricating a liquid crystal electro-optical device according to a first embodiment of the present invention comprises setting a pair of facing substrates subjected to orientation treatment, and sealing a mixture of a liquid crystal material and an uncured resin material wherein a reaction initiator is added to the uncured resin material. An orienting means for orienting (aligning) the liquid crystal molecules along one direction is provided on the inner side of at least one of the pair of substrates, so that the liquid crystals are oriented and the resin component is precipitated. Then, the thus precipitated resin component is cured by UV irradiation or the like to obtain a cured resin in the form of columns (pillars).

The cured resin columns function as resin spacers, and are therefore referred to hereinafter as "polymerized column spacers" ("PCSs"). The spacing between the substrates is then fixed by the PCSs. More specifically, the process comprises injecting a mixture of a liquid crystal material and an uncured resin between a pair of substrates, and the pair of substrates are adhered to each other using the resin columns formed by precipitating and curing the resin.

In the process according to the present embodiment, the resin columns can be cured while holding the liquid crystal molecules in a predetermined orientation inside the liquid crystal cell so that the resin is formed by precipitating it from a mixture of a liquid crystal material and an uncured resin. Thus, the spacing between the substrates can be kept at a fixed value while minimizing the disturbing in the orientation of the liquid crystal molecules around the resin. The resin can be cured by irradiating UV light and the like.

Figure 1A:
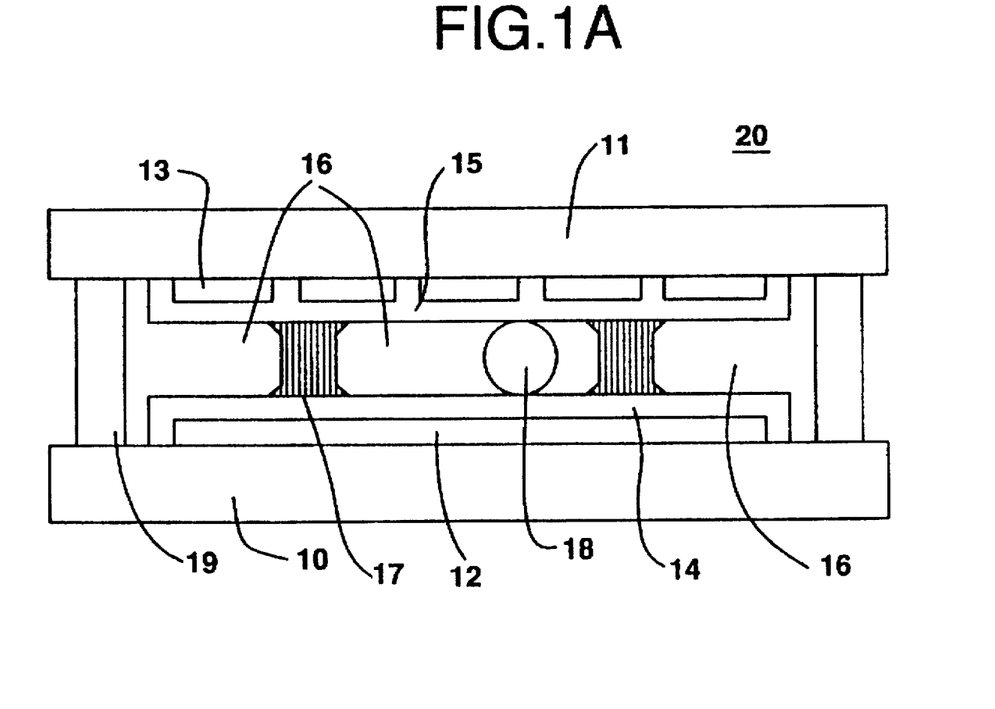
FIG. 1A is a schematically shown constitution of a liquid crystal electro-optical device according to a first embodiment of the present invention, in which the spacing between the substrate is fixed by resin columns precipitated from a mixture of a liquid crystal material.
Figure 1B:
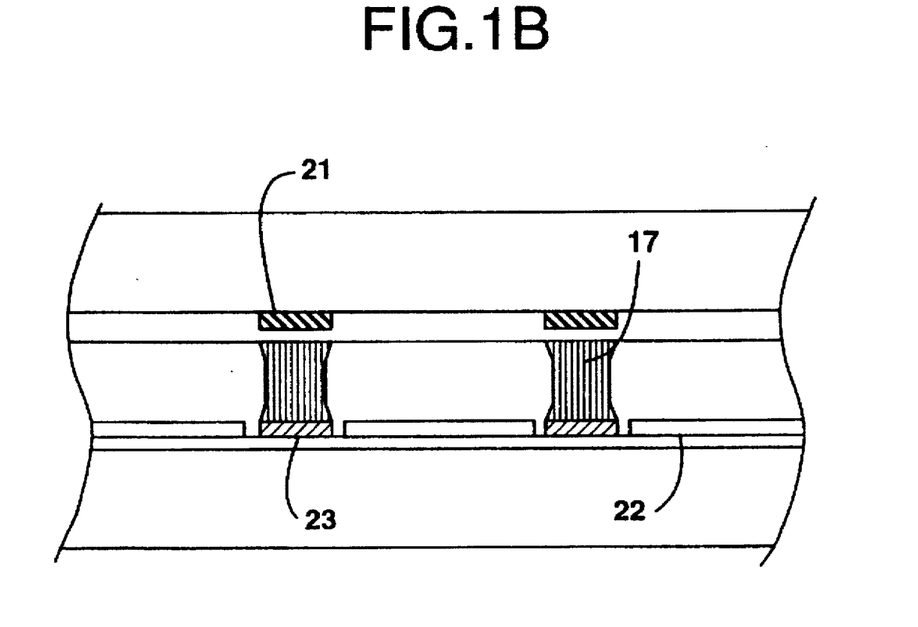
FIG. 1B is a further schematically shown electro-optical device of FIG. 1A.

Referring to FIG. 1, a liquid crystal electro-optical device 20 utilizing PCSs comprises light-transmitting substrates 10 and 11, electrodes 12 and 13, orientation films 14 and 15, a liquid crystal material 16, a resin 17, a spacer 18, and a sealing material 19. The resin 17 is columnar resin which is precipitated from the mixture of the liquid crystal material and the uncured resin and then cured. The resin 17 is adhered to the orientation films 14 and 15 to maintain the distance between the substrates to a constant value. In case the orientation film is formed on only one of the substrates, one end of the resin is adhered to either the electrode or the substrate.

In the process for fabricating the liquid crystal electro-optical device above, a mixture of a resin and a liquid crystal is injected into the vacant cell obtained by adhering the substrates inside the liquid crystal cell. The injection of the liquid crystal mixture is effected by vacuum method or by capillary method accompanied by heating. However, this process not only requires manpower for vacuum suction and a large scale equipment and the like, but also consumes much time. Considering the fabrication process, it comprises: adhering the substrates; irradiating UV to cure the sealing material; injecting a liquid crystal material between the substrates; precipitating a resin in the form of columns; and irradiating UV to cure the resin columns. It can be seen that this process involves more process steps as compared with an ordinary process for fabricating liquid crystal devices. Thus, it is demanded to reduce the time necessary per panel in fabricating a display device.

The liquid crystal material used in the present embodiment is CS1014, a ferroelectric liquid crystal manufactured by Chisso Corporation, having Ps of 5.4 nC/cm$^2$. It has phase transition in a series of I (isotropic phase)—N (nematic phase)—A (smectic A phase)—C (smectic C* phase). A mixture of a commercially available urethane oligomer and acrylic monomer is used as the resin material, according to the embodiment.

Those materials are mixed to obtain a mixture comprising 95% by weight of the liquid crystal and 5% by weight of the uncured resin, and the mixture is further heated at 90° C. and stirred to allow the liquid crystal to indicate phase transition to isotropic phase. Thus a liquid crystal mixture comprising the resin uniformly mixed in the liquid crystal material is obtained (this mixture is referred to simply hereinafter as "liquid crystal mixture").

Separately, indium tin oxide (ITO) as the electrode material is deposited on a glass substrate (10×10 cm in area) by sputtering or vapor deposition to a thickness of from 500 to 2,000 Å, specifically, 1,000 Å in this embodiment, and patterned by a conventional photolithography to obtain an electrode. Then, polyimide is applied to the surface of the resulting substrate by spin coating, and fired at 280° C. Polyimide suitable for use as the orientation film include RN-305 (a product of Nissan Chemical Industries, Ltd.) and LP-64 (a product of Toray Industries, Inc.). LP-64 is used specifically in the embodiment to form a polyimide film (150 Å in thickness). In general, the polyimide film is provided at a thickness of from 100 to 800 Å. The resulting substrate is then subjected to uniaxial orientation treatment by a rubbing process, and spherical silica grains (product of Catalysts and Chemicals industries Co., Ltd.) are scattered thereon as spacers. A sealing material is formed using UV-curable resin on the other substrate by screen printing.

Then, the resulting substrates are both heated to a temperature not lower than the transition temperature of the liquid crystal mixture, and a proper amount of the liquid crystal mixture in isotropic phase is dropped onto the substrate having the screen-printed sealing material. The substrate having the dropped liquid crystal mixture is then adhered with the other substrate having the spacers distributed thereon to obtain a liquid crystal cell having a spacing of 1.5 μm between the substrates. The resulting cell is then cooled gradually to room temperature. The uncured resin is separated from the liquid crystal material by allowing the uncured resin to precipitate from the mixture. The cell is subjected to microscopic observation under crossed nicols. The liquid crystal is found to be colored, and to be uniaxially oriented along the rubbing direction of the orientation film in the same manner as the liquid crystal material containing no resin added therein. Thus, a favorable extinction angle is obtained for the liquid crystal material. Furthermore, the resin is found to be distributed in the cell.

The resin distributed in the sealing portion and the display portion are cured by irradiating a UV light at an energy intensity of 20 mW/cm² for a duration of 1 minute over the entire surface of the liquid crystal cell including the sealing portion. UV light may be irradiated at an energy intensity in the range of from 3 to 30 mW/cm² for a duration of from 0.5 to 5 minutes. Similar to the state before curing the resin, the liquid crystal after curing the resin is found to be uniaxially oriented along the rubbing direction and to obtain a favorable extinction angle.

Conclusively, the process for fabricating a liquid crystal electro-optical device using PCSs comprises the following steps: dropwise applying a liquid crystal; adhering the pair of substrates; precipitating the resin in the form of columns; and irradiating UV light to cure the sealing material and the resin columns. Thus, the process of injecting liquid crystal material between the substrates, which is necessary in a prior art process, can be eliminated from the present process. Furthermore, UV irradiation needs to be performed only once in the process according to the present embodiment.

More specifically, the process according to the present embodiment comprises dropwise applying a liquid crystal mixture onto the surface of one of the pair of substrates, and then holding the liquid crystal mixture between the substrates to fill up the liquid crystal cell. The resin is then precipitated in the form of columns from the liquid crystal material, and UV radiation is irradiated thereafter to the entire surface of the liquid crystal cell including the sealing portion. Thus, the sealing portion and the resin columns can be cured in a single process. Also, the process of re-gapping can be eliminated.

Thus, as described in the foregoing, the present invention realizes a process for fabricating a liquid crystal electro-optical device simplified in process and shortened in process time.

Embodiment 2

In case a thin film transistor (TFT) or a metal insulator metal (MIM) element is provided on a substrate, the substrate provided facing these elements generally comprises a light shield film to prevent light from being irradiated to the element and to stabilize the operation of the elements. Hence, if an ordinary UV curable resin is used as the material for the PCSs, the resin present in the element portion cannot be cured due to the presence of the light shield film so that the adhesion strength of the entire substrates is reduced. Furthermore, the uncured resin dissolves into the liquid crystal material at higher temperatures and functions as impurities. Those impurities lead to an unstable display.

The present embodiment refers to a process for overcoming the problem above.

More specifically, with reference to FIG. 1B the process comprises forming, on the surface of a glass substrate of 10×10 cm in area, a TFT as a switching element and electrodes 22 such as pixel electrodes, signal electrodes, and scanning electrodes, using ITO.

Then, an ITO is provided as a counter electrode on the other substrate. This substrate is faced against the substrate having the TFT 23, thereon, and a light shield film 21, made of a film of chromium, aluminum, or an oxide thereof, are provided on the selected portions of ITO corresponding to each of the TFTs on the other substrate. The substrate having thereon the ITO film as the counter electrode is further coated with polyimide by spin coating method, sintered (fired) to form an orientation film, and the film is subjected to rubbing treatment to obtain uniaxial orientation.

Then, spacers are scattered on one of the substrates, while an epoxy resin sealing material is formed to the other substrate by screen printing. The resulting substrates are adhered to each other at a spacing of about 3 μm to obtain a liquid crystal cell.

The liquid crystal material used in the present embodiment is CS1014, a ferroelectric liquid crystal manufactured by Chisso Corporation, having Ps of 5.4 nC/cm². It indicated phase transition in a series of I (isotropic phase)—N (nematic phase)—A (smectic A phase)—C (smectic C* phase).

A commercially available acrylic modified epoxy resin is used as the resin material in the present embodiment. This resin material is UV curable, and it can be cured completely by heating. The temperature for curing the resin is preferably higher than the temperature when the liquid crystal indicates isotropic phase.

The materials above are mixed to obtain a liquid crystal mixture containing 95% by weight of the liquid crystal material and 5% by weight of the uncured resin. This process of mixing can be effected while heating the mixture to obtain a further well mixed product, at a temperature not as high as the temperature at which the resin is cured, and preferably, at a temperature at which the liquid crystal mixture exhibits an isotropic phase.

More specifically, the liquid crystal cell and the liquid crystal mixture is heated to 90° C., and cooled to room temperature after injecting the mixture to the cell under vacuum. The orientation of the liquid crystal molecules inside the liquid crystal cell after cooling is observed using an optical microscope. The resin material is found to be distributed inside the cell, whereas the liquid crystal material is found to be uniaxially oriented along the rubbing direction of the orientation film in the same manner as in a liquid crystal material containing no resin material added therein. A favorable extinction angle is observed.

The resin is then cured by irradiating UV light to the liquid crystal cell at an energy intensity of 20 mW/cm$^2$ for a duration of 1 minute. In general, the irradiation of UV light is preferably effected at an intensity of from 3 to 30 mW/cm$^2$ and for a duration of from 0.5 to 5 minutes. The cell is heated thereafter in an oven maintained at 160° C. for a duration of 2.5 hours to cure completely the resin.

After the irradiation of UV light and the heating, the liquid crystal is found to be uniaxially oriented along the rubbing direction of the orientation film. The cell obtains a favorable extinction angle, and the resin is found to be distributed. The liquid crystal cell is also found to be practically useful as a liquid crystal electro-optical device having a contrast ratio of 100.

The substrate of the resulting liquid crystal cell is peeled off, and the liquid crystal in the cell is washed or rinsed away to observe the resin columns remaining on the substrate using a scanning electron microscopy (SEM). Similar to the observation using an optical microscope, the resin remains as columns sparsely distributed on the substrate, and the element portions remain also as columns.

Separately, a liquid crystal cell is fabricated by the same procedure and under the same conditions as above, except for effecting no heating for curing the resin. The resulting substrate is again subjected to SEM observation to find the resin cured to give columns in the majority of the substrate area, except for the element portions and in the portions facing thereto. That is, the resin in the element portions and in the portions facing thereto is found to be present in trace portions and not in the form of cured resin columns.

The resin precipitated in the form of columns in the portions other than the element portion cures completely under the irradiation of a UV radiation. The UV radiation cannot be utilized as an energy source for curing the resin in the element portion because a light shield film is provided thereto. However, the presence of a light shield film does not impair the mechanical strength and the operation characteristics of the device, because the resin present in this portion under the light shield film can be cured by an additional heating.

As described in the foregoing, the present embodiment provides a process for fabricating a liquid crystal electro-optical device using polymerized column spacers formed by precipitating an uncured resin from a liquid crystal material mixed therein the uncured resin and then curing the precipitated resin, wherein a resin curable by both UV radiation and heat, specifically, acrylic modified epoxy resin, is used as the uncured resin to be mixed into the liquid crystal material. In this manner, the resin material present in the element portion having a light shield film can be cured to prevent the deterioration of mechanical strength and operational characteristics of the device from occurring.

Embodiment 3

Figure 2A:
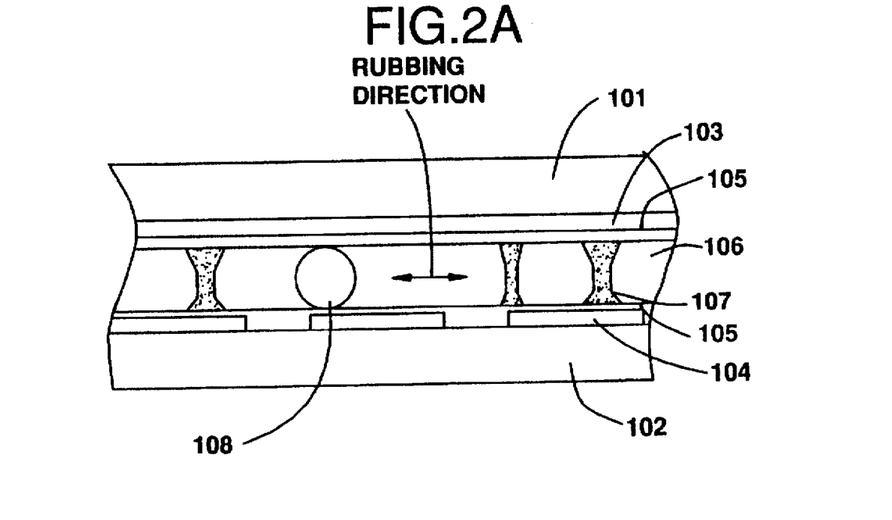
FIG. 2A is a partially drawn constitution of a liquid crystal electro-optical device according to the first embodiment of the present invention.

Referring to FIG. 2, a partial structure of a simple-matrix type liquid crystal display device is described below. The liquid crystal display device comprises light-transmitting substrates 101and 102 having electrodes 103 and 104, and an orienting means 105 such as an orientation film for orienting a liquid crystal material 106 along one direction is provided on the substrates 101 and 102. The liquid crystal material 106 held between the substrates 101 and 102 is uniaxially oriented according to the orienting means 105. A resin 107 precipitated and separated from the liquid crystal material 106 forms columns, and the resin columns are adhered to the orienting means 105 provided on the substrates 101 and 102. In case the orienting means 105 is formed only on one of the substrates, for example, the resin 107 is adhered to the orienting means 105 and the light-transmitting substrate 101 (102) or the electrode 103 (104).

The liquid crystal electro-optical device above can be fabricated by a process comprising: holding a mixture of a liquid crystal material 106 and an uncured resin added therein a reaction initiator between a pair of light-transmitting substrates 101 and 102 having thereon electrodes 103 and 104, wherein the substrates are provided at a predetermined distance from each other by of spacers 10 8; then precipitating the uncured resin from the mixture held between the substrates to orient the liquid crystal material 106 by an orienting means 105; curing the precipitated uncured resin using a curing means to obtain resin columns 107 wherein the substrates 101 and 102 are adhered with each other by the resin columns 107.

A liquid crystal electro-optical device having a constitution shown in FIG. 2 can be implemented by the process according to the present embodiment while favorably maintaining the initial orientation of the liquid crystal material 106, because the resin is cured after once orienting the liquid crystal material 106 by the orienting means 105. Thus, the cured resin hardly affects the orientation of the liquid crystal material. Thus, it can be seen that the cured resin columns 107 not only functions to maintain the spacing between the substrates, but also increases the adhesion strength between the substrates. Furthermore, it also improves the orientation of the liquid crystal materials.

In the constitution above, however, the position at which the resin columns precipitate cannot be controlled. Thus, in case the liquid crystal material and the resin are not precipitated uniformly, a non-uniform display may result. In case of a liquid crystal electro-optical device comprising switching elements such as thin film transistors, moreover, the precipitation of a resin on the pixel electrode reduces the aperture (opening) ratio. Furthermore, when ferroelectric liquid crystal is used as the liquid crystal material, the lack of unifomity in precipitated resin leads to the generation of orientation defects by destroy of a layer structure of the liquid crystal. Those defects decreases the contrast ratio of a display.

In forming polymerized column spacers, however, the present inventors have found that the position precipitating the columns of uncured resin from a mixture of the liquid crystal material and the uncured resin (the mixture is referred to simply hereinafter as "a liquid crystal mixture") is confined to a particular portion, i.e., a portion having a surface state differed from the others on the surface of the substrate to be in contact with the liquid crystal mixture. The position precipitating the resin, can be controlled by partially changing the surface state of at least one substrate to be in contact with the liquid crystal mixture.

Figure 2B:
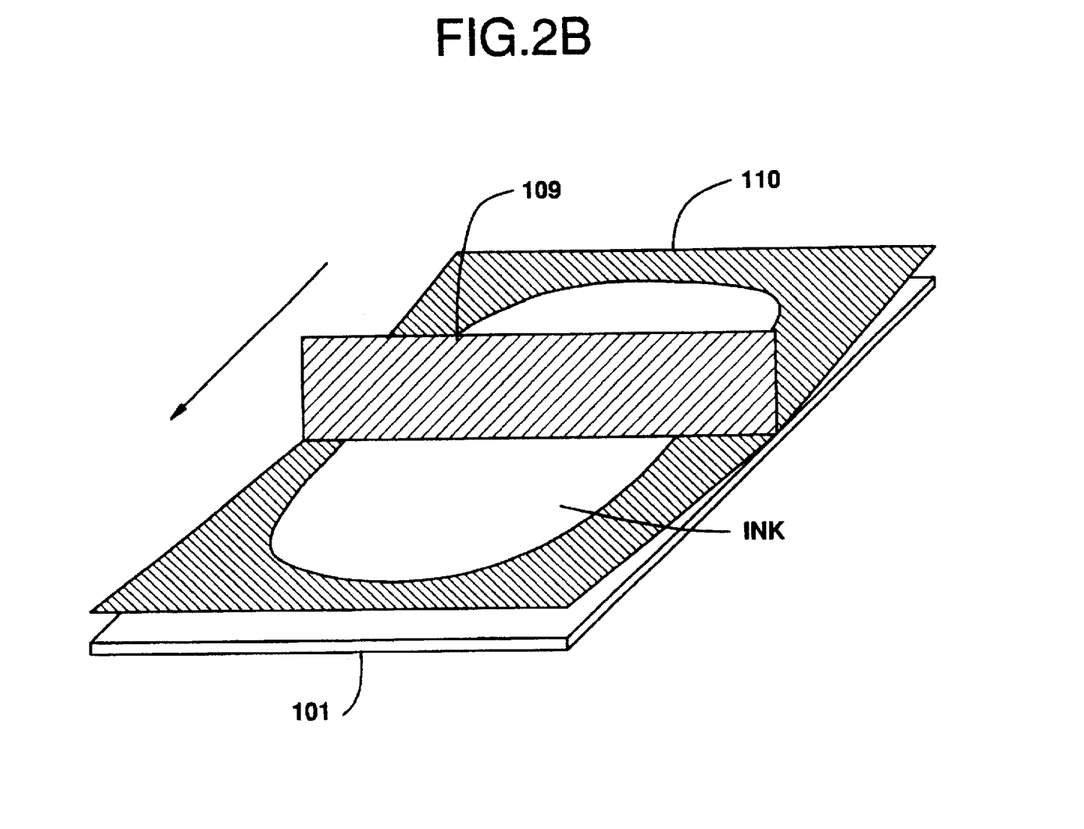
FIG. 2B is an example of screen printing for the electro-optical device of FIG. 2A.

The surface state of the substrate can be varied by, for example, with reference to FIG. 2B, employing a plate 110 for screen printing in the process of printing the sealing material in sealing the peripheral portion of the substrate. That is, the portions A corresponding to the crossing of the warp and the weft of the screen exhibit a surface state clearly distinguished from the other portions B. Thus, two portions A and B differing from each other in surface state can be formed by bringing the plate 110 with a squeegee 109 of screen printing into contact upon printing the sealing material.

After preparing the liquid cell composed of substrates having portions changed in surface state, a mixture of a liquid crystal material and an uncured resin is injected at a temperature at which the liquid crystal indicates an isotropic phase. The liquid crystal mixture is thereafter cooled gradually to room temperature. At the transformation from the isotropic phase to a liquid crystal phase during this cooling, the liquid crystal material precipitates on portions B, while the uncured resin precipitates on portions A.

The fine irregularities formed on the surface of the substrate are presumably the reason for the occurrence of this phenomena. Otherwise, a constituent material of the screen plate might have been transferred in trace amount to the surface of the substrate. At any rate, the portions differing in surface state as compared to that of the surroundings provide the precipitation position of uncured resin.

Thus, the process according to the present embodiment enables, for the first time, the control of the precipitation position for the resin columns as desired.

Figure 3A:
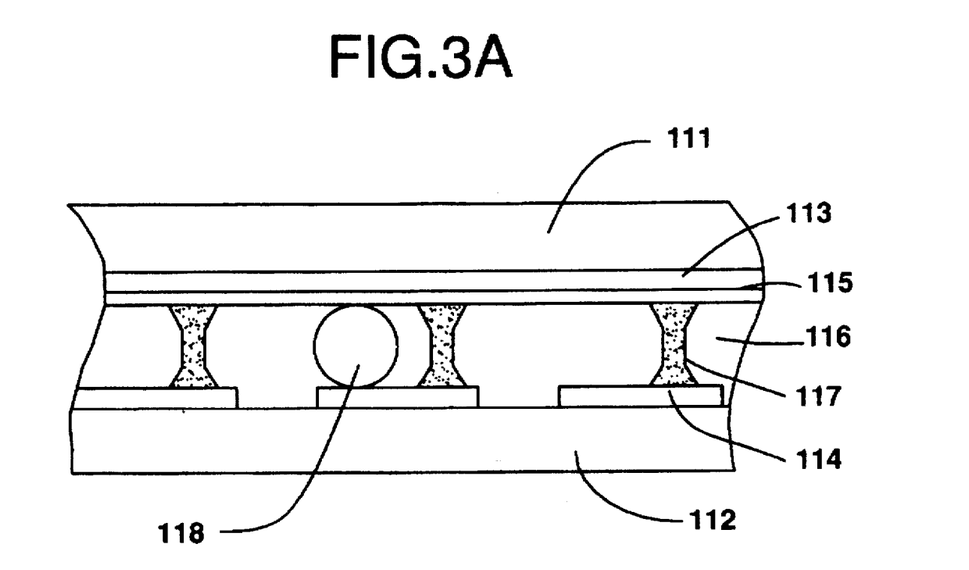
FIG. 3A is a schematically shown constitution of a liquid crystal electro-optical device according to a second embodiment of the present invention.

Referring to FIG. 3, the process for fabricating a ferroelectric liquid crystal cell according to an embodiment of the present invention is described below. The liquid crystal cell comprises two substrates 111 and 112 having thereon facing electrodes 113 and 114 in driving a liquid crystal material 116. The liquid crystal material 116 and the like is held between the substrates each made of a blue sheet glass 1.1 mm in thickness and 100×80 mm in area. Transparent electrodes (ITO) as electrodes 113 and 114 are formed on the substrates 11 and 112, respectively, by a deposition process such as sputtering. The ITO film has a thickness of 1,000 Å. The pixels are each 60×60 µm in size. The spacing of substrate is a spacing of 1.5 µm.

In the present embodiment, an orientation film 115 is formed on one of the electrodes formed on the substrate to arrange the liquid crystal molecules in a uniform orientation. Materials for the orientation film include a polyimide resin, specifically, for embodiment, LQ-5200 (a product of Hitachi Chemical Co., Ltd.), LP-64 (a product of Toray Industries, Inc.), and RN-305 (a product of Nissan Chemical industries, Ltd.). LP-64 is used in the present case. The orientation film 115 is formed by spin coating using a solution of LP-64 diluted by a solvent such as n-methyl-2-pyrrolidone. The substrate coated with the solution of LP-64 is then heated at a temperature in the range of from 250° to 300° C., specifically at 280° C. in this case, for a duration of 2.5 hours to vaporize the solvent. The coated film is imidized and cured. The film thickness after curing is of 300 Å.

Figure 3B:
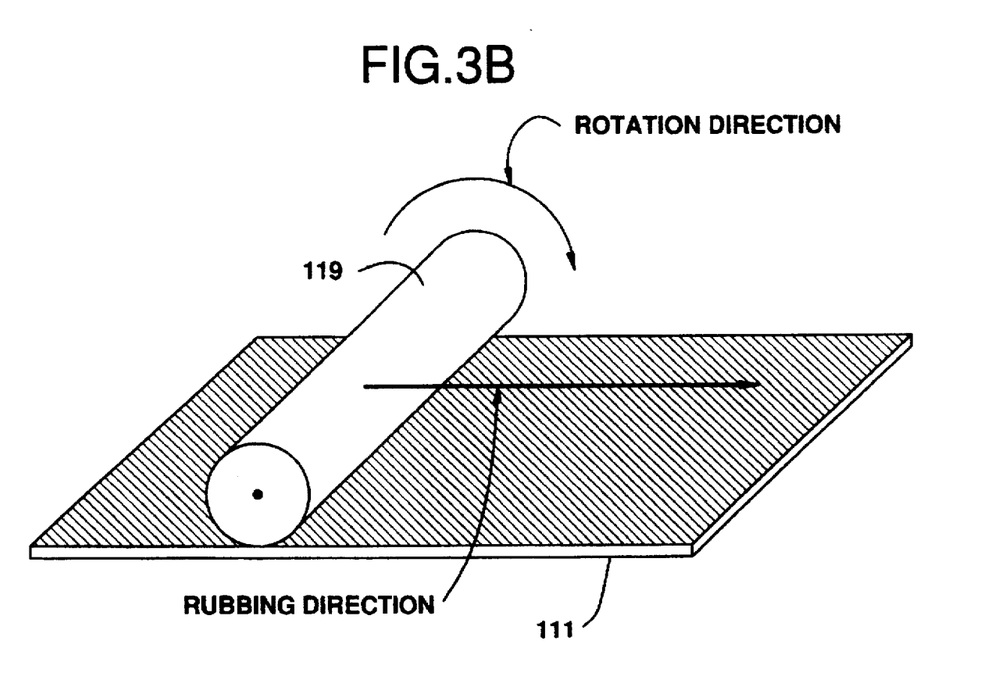
FIG. 3B is an example of rubbing action for the electro-optical device of FIG. 3A.

The orientation film 115 thus obtained is then subjected to rubbing treatment. With reference to FIG. 3B, rubbing treatment can be effected by rubbing the film along one direction using a roller 119 wound with a cloth such as Rayon and cotton, at a rate of from 450 to 900 rpm, specifically, 450 rpm in the present embodiment.

Figure 3C:
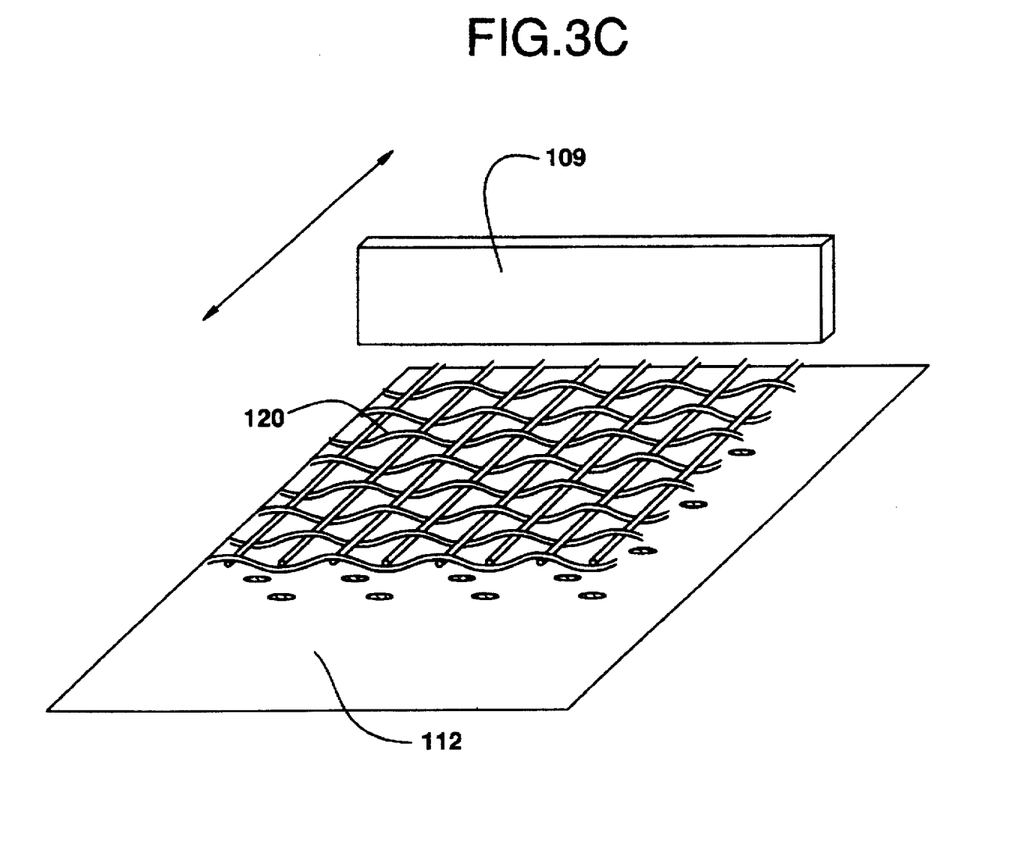
FIG. 3C is an example of screen printing for the electro-optical device of FIG. 3A.

Then, to maintain the spacing between the substrates to a constant value, spheres (1.5 µm in diameter, product of Catalysts and Chemicals Industries Co., Ltd.) are scattered as spacers 118 on the substrate having thereon the orientation film 115. Furthermore, the two substrates are fixed by adhering them together using a two-liquid epoxy resin adhesive 117 as the sealing material. The two-liquid epoxy resin adhesive 117 is applied to the periphery of one of the substrates by screen printing for example, as provided in FIG. 3C. The plate 120 used in screen printing has meshes of 230. That is, 210 represent the number of spaces surrounded by the longitudinal and transverse wires. Thus, wires by which the screen is constituted are each 28 µm in diameter and arranged to make a distance of 101.6 µm between each other.

Then, a mixture of a liquid crystal material 116 and an uncured polymer resin is injected into the cell. A biphenyl ferroelectric liquid crystal is used as the liquid crystal material. The liquid crystal indicates phase transformation according to a sequence of Iso —SmA—SmC*—Cry, and is a 1:1 mixture of two liquid crystal materials each expressed by the structural formula:

A commercially available UV-curable resin is used as the polymer resin. The liquid crystal material and the uncured polymer resin are mixed at ratio by weight of 95:5 or 85:15. The mixture is mixed at a temperature in the range of isotropic phase to obtain a uniform mixture. The temperature of the transformation from the Iso-phase to the SmA-phase is found to decrease by 5 to 20 degrees as compared to the transformation temperature of a pure liquid crystal material.

The mixture is then injected into the liquid crystal cell under vacuum while maintaining the temperature of the cell and the mixture at 100° C. The liquid crystal cell thus filled with the mixture is then gradually cooled at a rate of 3° C./hour. This cooling is generally effected at a rate in the range of from 2° to 20° C./hour.

Figure 4:
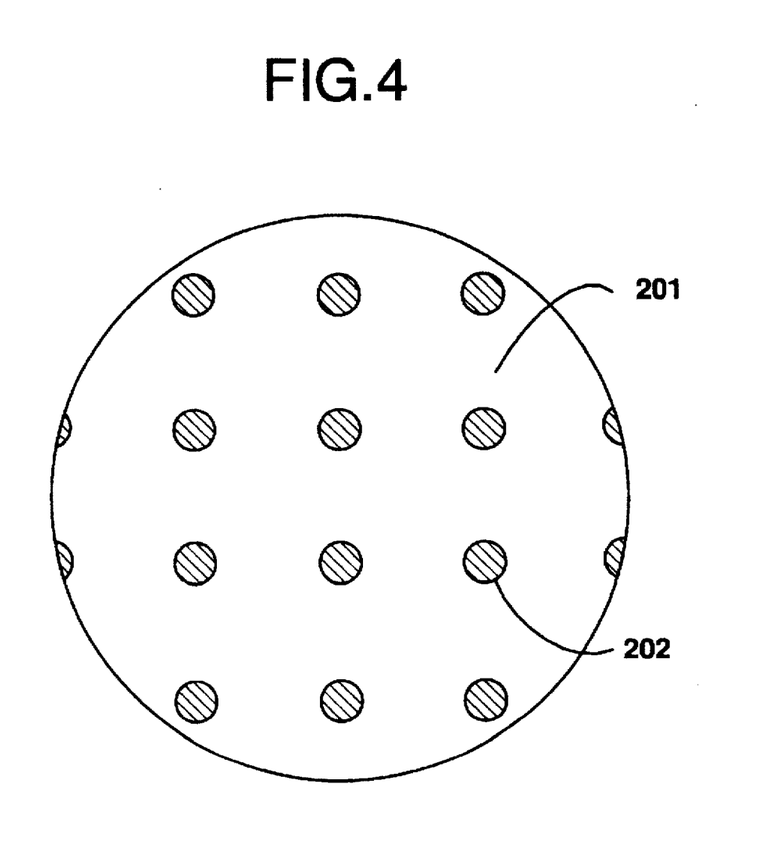
FIG. 4 shows the precipitation state of resin columns obtained according to an embodiment of the present invention.

An orientation state of the liquid crystal cell thus obtained is observed using a polarization microscope under crossed nicols. Extinction (the state at which the light incident to one of the polarizers is cut off by the other polarizer) is found to occur at a particular angle of rotation. This is a clear evidence for the uniform orientation of the liquid crystal material. Furthermore, uncured resin is found to precipitate scatteredly in the liquid crystal material. FIG. schematically shows such state. The uncured resin 202 is opaque under the microscope because it does not exhibit any birefringence. Thus, it can be seen that the liquid crystal material 201 is clearly separated from the uncured resin 202.

The uncured resin is precipitated at a regular spacing along both of the transverse and the longitudinal direction. That is, the uncured resin is precipitated every 102-µm in interval. The interval between the neighboring resin is equal to the aperture of the screen. Orientation defects such as zigzag defects are seldom found to occur on the liquid crystal material.

The polymer resin in the cell is cured by irradiating UV radiation at an irradiation intensity of 10 mW/cm² for a duration of 1 minute. In general, the UV irradiation is effected at an irradiation energy of from 3 to 30 mW/cm² for a duration of from 0.5 to 5 minutes.

After UV (ultraviolet) radiation, the molecular orientation of the liquid crystal in the cell is observed using a polarization microscope in the same manner as above. However, change is seldom observed in the molecular orientation. Thus, the UV irradiation does not affect the state of molecular orientation of the liquid crystal.

The optical characteristics of the resulting liquid crystal cell are measured. More specifically, the intensity of the light transmitted through the liquid crystal cell is detected by a photomultiplier under crossed nicols on a polarization microscope equipped with a halogen lamp as the light source. The results are listed below.

| Measured Contrast Ratio | | |
|---|---|---|
| Resin content | 5% | 15% |
| ON | 30 | 27 |
| OFF | 0.6 | 0.6 |
| Contrast ratio | 50 | 45 |

As can be seen from the results, in case an uncured resin mixed in the liquid crystal material has a higher resin content, since an area which the resin columns 117 occupies in electrode portions are large, transmittance at the ON state of the liquid crystal is low, however, the contrast ratio is approximately the same.

The presence of resin in the electrode portion of the liquid crystal cell is hardly discernible with the naked eye. As can be seen from the above results, a favorable display can be obtained with a cell containing uncured resin at a content of from about 0.1 to 20% in comparison with a liquid crystal cell employing pure liquid crystal material.

Furthermore, no change is observed to occur on the liquid crystal cell when its display plane is set upright. The polymerized column spacers scattered in the liquid crystal material tightly adhere the two substrates to maintain the spacing between the substrates constant and to prevent expansion from occurring on the liquid crystal cell.

The cross section of the liquid crystal cell is observed with a scanning electron microscope (SEM). The liquid crystal material is extracted using alcohol. The SEM observation revealed that the resin is cured to form columns between the two substrates.

The form of the cured resin depends on the phase transformation sequence and the cooling rate of the mixture comprising the liquid crystal and the resin. Thus, the cured resin may have irregular forms, or may be of such a shape having a major axis along the direction of uniaxial orientation treatment.

In case of fabricating an active matrix type liquid crystal electro-optical device comprising switching elements such as thin film transistors connected to each of the pixels, the position for precipitating the resin can be controlled by, for example: designing the electrode pitch and the like in such a manner that the wire crossings of the screen plate may be positioned just over the switching elements; or selecting the number of mesh in the screen plate and position-fitting the screen plate into the substrate having the switching elements at the printing of the sealing material. Thus, the surface state of the portions corresponding to the locations of the switching elements can be differed from that of the other portions having no switching elements thereon. As a result, it is possible to increase the aperture ratio by selectively precipitating the resin on the switching elements or the scanning or selection electrodes, while preventing the resin from precipitating on the pixel electrodes.

A ferroelectric liquid crystal is used specifically in the present embodiment, however, the embodiment described in the present embodiment is also effective in cases using other types of liquid crystals, such as nematic liquid crystals.

Thus, the process according to the present invention provides a liquid crystal electro-optical device using polymerized column spacers formed by: precipitating an uncured resin from a liquid crystal material mixed therein the uncured resin; and curing the thus precipitated resin, wherein the polymerized column spacers can be precipitated at desired position. By thus placing the liquid crystal material and the polymerized column spacers uniformly over the entire liquid crystal electro-optical device, a uniform display state can be realized.

In case a ferroelectric liquid crystal is used as the liquid crystal material, the resin can be precipitated by taking the layer structure characteristic of the ferroelectric liquid crystal into consideration. Thus, orientation defects such as zigzag defects can be prevented from generating, and hence, the contrast ratio can be increased.

It is also possible to precipitate the resin on only the portions other than the pixel portions. In case of liquid crystal electro-optical device of an active matrix type having switching elements such as thin film transistors connected to each of the pixels, in particular, the aperture ratio of the pixel can be increased by precipitating the polymerized column spacers on the upper side of the portions other than the pixels, for example, switching elements, scanning electrodes, and selection electrodes. When the polymerized column spacers are formed on the upper side of the switching elements, particularly, the portions corresponding to the position on which polymerized column spacers are formed exhibit a dark state, because the polarization plate cuts off the light passed through the optically isotropic polymerized column spacers. The light shield film, which has been essential in conventional devices and which hence are formed on the substrate having no switching elements, can be excluded from the device of the embodiment according to the present invention.

Embodiment 4

Figure 5:
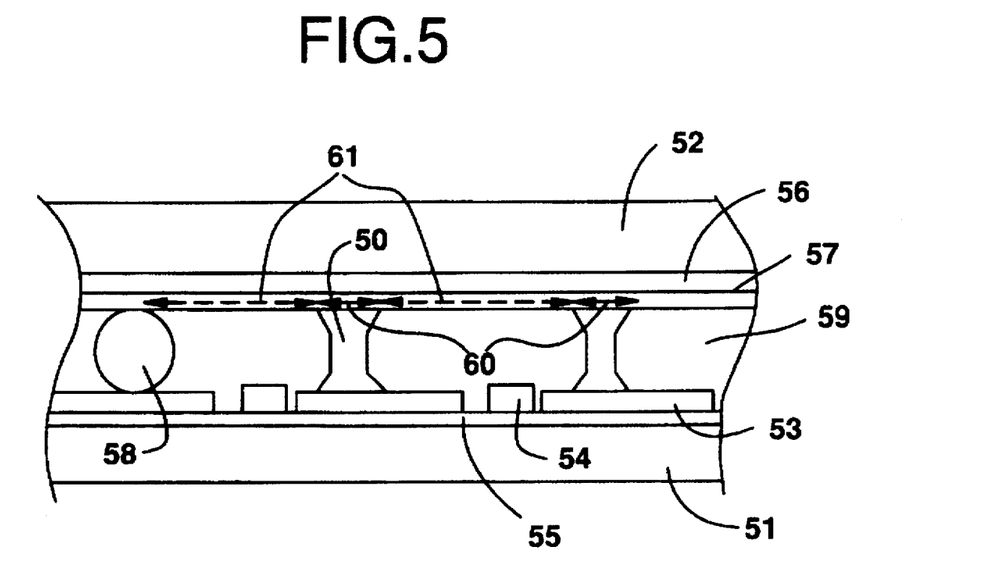
FIG. 5 is a schematically shown constitution of a liquid crystal electro-optical device according to a third embodiment of the present invention.

FIG. 5 shows a constitution of an active matrix type liquid crystal device according to the embodiment of the present invention. Referring to FIG. 5, the liquid crystal display device comprises light-transmitting substrates 51 and 52, pixel electrodes 53 and 56, a switching element 54, an insulation film 55, an orientation means 57 such as an orientation film for orienting a liquid crystal material 59 along one direction, a spacer 58, and a resin column (polymerized column spacer) 50. The liquid crystal material 59 is uniaxially oriented according to the orientation means 57. The resin 50 separated from the liquid crystal material, and precipitated in columns is adhered to the orientation means 57 provided on two substrates 51 and 52. When the orientation means is formed on only one of the substrates, the resin adheres, for example, to the orientation means 57 and the substrate or the electrode.

The liquid crystal electro-optical device above can be fabricated by holding a mixture of a liquid crystal material and an uncured resin added therein a reaction initiator between a pair of light-transmitting substrates 51 and 52. The pair of substrates each have thereon electrodes 53 and 5 6, and the spacing therebetween is maintained constant by spacers 58. Then, the uncured resin is precipitated from the mixture to orient the liquid crystal material 59 by the orientation means 57. The pair of substrates are adhered curing the uncured resin.

In case of fabricating a liquid crystal display device having a constitution as illustrated in FIG. 5, the cured resin hardly influences the orientation of the liquid crystal, because the resin is cured after the liquid crystal material 59 establishes an orientation according to the orientation means 57. Thus, the liquid crystal material can maintain the favorable orientation state once acquired before curing the resin. The cured resin columns 59 not only maintains the spacing between the substrate to a constant value, but also increases the adhesion strength between the substrates and the orientation of the liquid crystal.

As described in the constitution above, however, it is difficult to control the position for precipitating the resin in the form of columns. Thus, in the process according to the embodiment of the present invention, the surface state of at least one of the substrates to be in contact with the mixture is partially modified to provide the positions precipitating the resin. This is based on the observation of the present inventor that the position precipitating the uncured resin are confined to the portions having a partially changed surface state.

The present inventor has found further that the uncured resin precipitated from a liquid crystal mixture of a liquid crystal material and an uncured resin forms resin columns on hydrophobic portions of the surface to be in contact with the liquid crystal mixture. This indicates that the resin can be precipitated on the substrate at portions 60 which are intentionally rendered hydrophobic. Conclusively, the positions precipitating the resin can be controlled as desired.

For instance, when a screen plate for use in the screen printing is in contact with the substrate in printing a sealing material on the periphery of the substrate, portion A corresponding to the contact area of the warp and the weft of the screen and portion B corresponding to the other generate on the surface of the substrate. Thus, two portions differing in surface state are formed on the substrate.

The two portions A and B differ from each other in polarity of surface tension. More specifically, the portion A corresponding to the area pressed against the wires of the screen tend to be hydrophobic.

Thus, a mixture of a liquid crystal material and an uncured resin is injected at the temperature range of isotropic phase of the liquid crystal into a liquid crystal cell constructed of substrates having two portions differing in surface state, and then gradually cooled to room temperature. During the cooling, the mixture indicates phase transformation from the isotropic phase to a liquid crystal phase; at that point, the liquid crystal material precipitates on the portion B, and the uncured resin precipitates on the portion A.

The precipitation positions for the polymerized column spacer can be defined as desired by providing hydrophilic 61 or hydrophobic 60 portions on the surface of the substrate to be in contact with the liquid crystal mixture, by applying a coupling agent and the like, forming a film of carbon or fluorine, or irradiating a laser beam.

Figure 6:
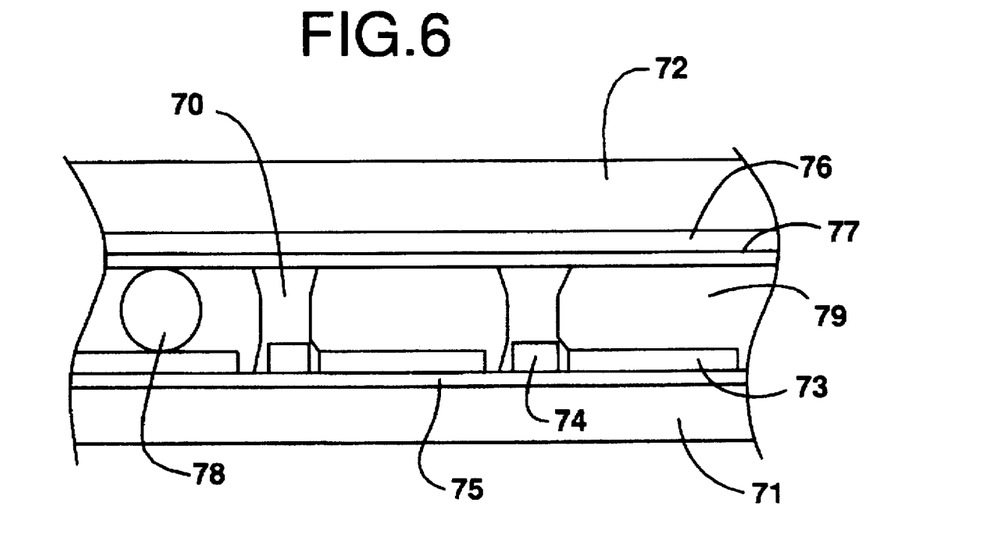
FIG. 6 is a schematically shown constitution of a liquid crystal electro-optical device according to a fourth embodiment of the present invention.

Referring to FIG. 6 showing the constitution of a liquid crystal cell, an alkali-free glass substrate 71 is used as one of a pair of substrates. An active matrix 74 comprising a pixel electrode 73 and crystalline silicon TFTs is formed on the substrate 71. The pixel electrode 73 used herein is 100×100 μm in size. The matrix defined by the scanning electrodes and the signal electrodes connected to the TFTs is 108×108 μm in size. An insulation film 75 is formed on the substrate 71, while an ITO film 76 is formed on the entire surface of the other substrate 72. An orientation film 77 is formed on the substrate having only the electrode, and the substrate is placed at a distance of 1.5 μm from the other substrate.

The orientation film material is made of a polyimide resin, specifically, for example, LQ-5200 (a product of Hitachi Chemical Co., Ltd.), LP-64 (a product of Toray industries, Inc.), and RN-305 (a product of Nissan Chemical industries, Ltd.). LP-64 is used in the present case. The orientation film 77 is formed by spin coating using a solution of LP-64 diluted by a solvent such as n-methyl-2-pyrrolidone. The substrate coated with the solution of LP-64 is then heated at a temperature in the range of from 250° to 300° C., specifically at 280° C. in this case, for a duration of 2.5 hours to vaporize the solvent and the coated film is imidized and cured. The film thus obtained had a thickness of 300 Å.

The orientation film thus obtained is then subjected to rubbing treatment. Rubbing treatment can be effected by rubbing the film along one direction using a roller wound with a cloth such as Rayon and cotton, at a rate of from 450 to 900 rpm, specifically, 450 rpm in the present embodiment.

Then, to maintain the spacing between the substrates to a constant value, spheres (1.5 μm in diameter, product of Catalysts and Chemicals Industries Co., Ltd.) are scattered as the spacers 78 on the substrate having thereon the orientation film 77. Furthermore, the two substrates are fixed by adhering them together using a two-liquid epoxy resin adhesive as the sealing material. The two-liquid epoxy resin adhesive is applied to the periphery of one of the substrates by screen printing, and the two substrates are adhered to fix. The plate for screen printing is oriented with the substrate in such a manner that each of the warps and the wefts may be superposed to the positions corresponding to the scanning electrodes and the signal electrodes, respectively. The plate used in the present embodiment has meshes of 230. That is, 250 represents the number of spaces surrounded by the longitudinal and transverse wires (warps and wefts). Thus, the screen is made of wires having 35 μm in diameter and arranged to make a distance of 108 μm between each other, and this distance is equivalent to the length of the square space defined by two neighboring scanning electrodes and two neighboring signal electrodes.

Then, a mixture of a liquid crystal material and an uncured polymer resin is injected into the cell. A biphenyl ferroelectric liquid crystal is used as the liquid crystal material. The liquid crystal indicates phase transformation according to a sequence of Iso—SmA—SmC*—Cry, and is a 1:1 mixture of two liquid crystal materials each expressed by the structural formula:

A commercially available UV-curable resin is used as the polymer resin. The liquid crystal material and the uncured polymer resin are mixed at a ratio by weight of 85:15. A homogeneous mixture is obtained by mixing the mixture at a temperature in the range of isotropic phase. The temperature of the transformation from the iso-phase to the SmA-phase is found to decrease by 5 to 20 degrees as compared to the transformation temperature of a pure liquid crystal material.

The mixture thus obtained is then injected into the liquid crystal cell under vacuum while maintaining the temperature of the cell and the mixture at 100° C. The liquid crystal cell thus filled with the mixture is then gradually cooled at a rate of 3° C./hour. This cooling is generally effected at a rate in the range of from 2° to 20° C./hour.

The orientation state of the liquid crystal cell thus obtained is observed using a polarization microscope under crossed nicols. Extinction (the state at which the light incident to one of the polarizers is cut off by the other polarizer) is found to occur at a particular angle of rotation. This is a clear evidence for the liquid crystal material having a uniform orientation.

Furthermore, uncured resin is found to precipitate only on the portions between the pixels, i.e., on the portions corresponding to the TFTs and the interconnection of the electrodes. Resin is seldom found to precipitate on the portion corresponding to the pixel electrodes. The uncured resin is opaque under the microscope because it does not exhibit any birefringence. Thus, it can be seen that the liquid crystal material is clearly separated from the uncured resin.

Thus, it can be seen from the foregoing that the liquid crystal material tend to precipitate more easily on the portions which are not subjected to pressing. This fact suggests that the application of a pressure changes the surface polarity of the substrate. Accordingly, a test is effected on a model to study the change in surface polarity of the orientation film. The same orientation film used above is applied to the substrate under the same conditions for forming the film and for rubbing. Then, a cylindrical rod (1 cm in diameter) is pressed against the orientation film. The pressure applied to the film, the polar term of the surface tension for the pressed portion, and that for the portion not subjected to pressing, are measured. The results are summarized below.

| Change in Surface Tension (polar term) with Applying Pressure to the Surface of the Film | | | | | | |
|---|---|---|---|---|---|---|
| Pressure (kgf/cm$^2$) | 2 | 4 | 6 | 8 | 10 | Non-contact |
| Surface Tension (dyne/cm) | 10 | 7 | 5 | 5 | 5 | 12 |

The results above show that the values of the polar term are smaller for the portions subjected to pressing as compared with those of the portions not subjected to pressing. This signifies that the pressed portions has hydrophobic. Furthermore, it is found in the present experiment that a constant surface tension results when the applied pressure is increased to 6 kgf/cm$^2$ or higher.

The polymerized column spacer 70 is formed, as described in the foregoing, by orienting the liquid crystal molecules in the liquid crystal mixture and gradually cooling the mixture to precipitate the resin material. That is, the liquid crystal material 79 precipitate and orient themselves on the portions not subjected to pressing, i.e., the hydrophilic portions, and then, the resin precipitate on the portion having hydrophobic by the pressure applied thereto. Furthermore, orientation defects such as zigzag defects are seldom found to form in the liquid crystal material.

The polymer resin in the cell is cured thereafter by irradiating UV radiation at an irradiation intensity of 10 mW/cm$^2$ for a duration of 1 minute. In general, the UV irradiation is effected at an irradiation energy of from 3 to 30 mW/cm$^2$ for a duration of from 0.5 to 5 minutes.

The molecular orientation of the liquid crystal in the cell is observed using a polarization microscope in the same manner as above. However, change is seldom observed in the molecular orientation. Thus, the UV irradiation does not affect the state of molecular orientation of the liquid crystal.

The optical characteristics of the resulting liquid crystal cell are measured. More specifically, the intensity of the light transmitted through the liquid crystal cell is detected by a photomultiplier under crossed nicols on a polarization microscope equipped with a halogen lamp as the light source. The results are listed below.

| Measured Contrast Ratio | |
|---|---|
| ON | 30 |
| OFF | 0.6 |
| Contrast ratio | 50 |

It can be seen from the results above that the liquid crystal cell has a high contrast ratio. That is, a high aperture ratio is realized because almost no cured polymer resin (polymerized column spacer) 70 is present in the electrode portion.

The portion surrounding each of the pixels are found to display a dark state similar to a black matrix.

Furthermore, no change is observed to occur on the liquid crystal cell when its display plane is set upright. The polymerized column spacers distributed in the liquid crystal material tightly adhere the two substrates to maintain the spacing between the substrates constant and to prevent expansion from occurring on the liquid crystal cell.

The cross section of the liquid crystal cell is observed with a scanning electron microscope (SEM). The liquid crystal material is extracted using alcohol. The SEM observation revealed that the resin is cured to form polymerized column spacers in a wall-like form between the two substrates except for the portion corresponding to the pixel electrodes.

The walls of the polymerized column spacers are found to be present approximately on the signal lines and the scanning lines for connecting the switching elements and the pixels to surround the periphery of the pixels.

A ferroelectric liquid crystal is used specifically in the present example, however, the embodiment is also effective in cases using other types of liquid crystals, such as nematic liquid crystals. Further, a single matrix type is effective in the present invention.

Thus, the process according to the present invention provides a liquid crystal electro-optical device using polymerized column spacers formed by: precipitating an uncured resin from a liquid crystal material mixed therein the uncured resin; and curing the thus precipitated resin, wherein the polymerized column spacers can be precipitated at desired positions. By thus placing the liquid crystal material and the polymerized column spacers uniformly over the entire liquid crystal electro-optical device, a uniform display state can be realized.

Furthermore, orientation defects such as zigzag defects can be prevented from generating, and the contrast ratio can be thereby increased.

The process according to the present invention furthermore enables precipitating the resin on only the portions other than those corresponding to the pixel electrodes. In a liquid crystal electro-optical device of an active matrix type comprising switching elements such as thin film transistors connected to each of the pixels, the polymerized column spacers can be formed on only those portions other than the pixel electrodes (for instance, the portions corresponding to the switching elements, scanning electrodes, and signal electrodes) to increase the aperture ratio. This results in the increase of the contrast ratio of the entire device.

When polymerized column spacers are formed on the switching elements, a black colored state is realized because the polymerized column spacers have optically isotropic and a light does not pass through the polymerized column spacers by the polarizer plate. It can be seen therefore that the polymerized column spacers have the same function as that of a light shield film which is generally formed on the substrate of the facing electrode side to prevent the fluctuation in conductivity due to light from occurring on the switching elements. Thus, the light shield film can be eliminated from the liquid crystal electro-optical device according to the present invention.

Furthermore, polymerized column spacers can be formed continuously in the form of a wall on the portions other than the pixels. Thus, the periphery of the pixel electrodes can be displayed in a black colored state in the same manner as in the case using a light shield film described above. Accordingly, the device of the present invention also functions as a black matrix particularly useful in a color liquid crystal electro-optical device. Moreover, a similar effect can be obtained for a device of a simple-matrix type comprising a resin formed between the substrates.

While the invention has been described in detail and with reference to specific embodiments thereof, it will be apparent to one skilled in the art that various changes and modifications can be made therein without departing from the spirit and scope thereof.

What is claimed is:

1. A method for fabricating a liquid crystal electro-optical device, the method comprising the steps of:
    partially modifying a state of a surface of at least one of first and second substrates to have hydrophobic and hydrophilic portions wherein the surface is in contact with a mixture of a liquid crystal material, an uncured resin and a sealing material so that the uncured resin is precipitated at a desired position;
    placing said mixture of the liquid crystal material, said uncured resin and said sealing material on a first substrate;
    adhering said second substrate on the surface of the first substrate onto which the mixture is placed;
    precipitating the uncured resin from the mixture; and
    simultaneously curing the sealing material and the precipitated uncured resin so that polymerized spacers are formed using the cured resin,
    wherein said uncured resin is precipitated at regular spacing along both a transverse and longitudinal direction within said liquid crystal material.

2. A method of claim 1, wherein the sealing material has an ultraviolet-curable material, the uncured resin has an ultraviolet-curable material and the sealing material and the uncured resin are cured by ultraviolet radiation.

3. A method of claim 1, wherein the sealing material and the uncured resin are cured by heat.

4. A method for fabricating a liquid crystal electro-optical device comprising a pair of substrates facing each other and one of the substrates having a light shield film, the method comprising the steps of:
    holding between the pair of substrates, a mixture of liquid crystal material and an uncured resin curable by ultraviolet radiation or heat, the uncured resin comprising an acrylic modified epoxy resin;
    precipitating the uncured resin from the mixture; and
    curing the precipitated uncured resin by ultraviolet radiation or heat to form polymerized spacers.

5. A method for fabricating a liquid crystal electro-optical device, the method comprising the steps of:
    partially modifying a state of a surface of at least one of a pair of substrates wherein the surface is in contact with a mixture of a liquid crystal material and an uncured resin, to precipitate the uncured resin at a desired position;
    holding the mixture between the pair of substrates;
    precipitating the uncured resin from the mixture; and
    curing the precipitated uncured resin.

6. A method of claim 5, wherein the uncured resin is cured by a ultraviolet radiation.

7. A method of claim 6, wherein the uncured resin is cured by heat.

8. A method for fabricating a liquid crystal electro-optical device, the method comprising the steps of:
    partially modifying a state of a surface of at least one of a pair of substrates wherein the surface is in contact with a mixture of a liquid crystal material and an uncured resin by pressing a plate for screen printing against the surface, to precipitate the uncured resin at a desired position;
    holding the mixture between the pair of substrates;
    precipitating the uncured resin from the mixture; and
    curing the precipitated uncured resin.

9. A method of claim 8, wherein the uncured resin is cured by a ultraviolet radiation.

10. A method of claim 8, wherein the uncured resin is cured by heat.

11. A method for fabricating a liquid crystal electro-optical device, the method comprising the steps of:
    screen printing on one of the pair of substrates a sealing material for adhering peripheral portions of the substrates each other;
    partially modifying a state of a surface of the other substrate on which the sealing material is not screen printed, to precipitate an uncured resin at a desired position;
    holding a mixture of a liquid crystal material and the uncured resin between the pair of substrates;
    precipitating the uncured resin in the form of columns from the mixture; and
    curing the precipitated uncured resin.

12. A method of claim 11, wherein the uncured resin is cured by ultraviolet radiation.

13. A method of claim 11, wherein the uncured resin is cured by heat.

14. A method for fabricating a liquid crystal electro-optical device, the method comprising the steps of:
    preparing at least one of a pair of substrates having a surface to be in contact with a mixture of a liquid crystal material and an uncured resin, the surface having hydrophobic and hydrophilic portions, to precipitate the uncured resin at a desired position;
    holding the mixture between the pair of substrates;
    precipitating the uncured resin from the mixture; and
    curing the precipitated uncured resin.

15. A method of claim 14, wherein the uncured resin is cured by a ultraviolet radiation.

16. A method of claim 14, wherein the uncured resin is cured by heat.

17. A method for fabricating a liquid crystal electro-optical device, the method comprising the steps of:
    pressing a substance having a lattice form against a surface of at least one of a pair of substrates wherein the surface is in contact with a mixture of a liquid crystal material and a uncured resin, to precipitate the uncured resin at a desired position;
    holding the mixture between the pair of substrates;
    precipitating the uncured resin from the mixture; and
    curing the precipitated uncured resin.

18. A method of claim 17, wherein the uncured resin is cured by a ultraviolet radiation.

19. A method of claim 17, wherein the uncured resin is cured by heat.

20. A liquid crystal electro-optical device comprising:
    a pair of substrates for holding a mixture of a liquid crystal material and an uncured resin, said uncured resin comprising an acrylic modified epoxy resin;
    orienting means for uniaxially orienting the liquid crystal material, the orienting means being arranged on at least one of the pair of substrates,
    wherein the orienting means has a surface with a partially modified surface state and the surface is in contact with the mixture so that the uncured resin is precipitated from the mixture at a desired position and cured to form polymerized spacers.

21. A device of claim 20, further comprising a pixel electrode wherein the uncured resin is precipitated around the pixel electrode.

22. A device of claim 20, wherein the uncured resin is cured by an ultraviolet radiation.

23. A device of claim 20 wherein the uncured resin is cured by heat.

24. The device of claim 20, said device including polymerized column spacers formed from the precipitated and cured resin wherein said partially modified surface state of the surface of said orienting means provides the site for the precipitation of the resin and polymerized column spacers.

25. A liquid crystal electro-optical device comprising:

a pair of substrates for holding a mixture of a liquid crystal material and an uncured resin, said uncured resin comprising an acrylic modified epoxy resin; and a pair of pixel electrodes arranged on the substrates, wherein at least the substrate or the pixel electrode has a surface with a partially modified surface state and the surface is in contact with the mixture so that the uncured resin is precipitated from the mixture at a desired position and cured to form polymerized spacers.

26. A device of claim 25, wherein the uncured resin is precipitated around the pixel electrodes.

27. A device of claim 25, wherein the uncured resin is cured by an ultraviolet radiation.

28. A device of claim 25, wherein the uncured resin is cured by heat.

29. The device of claim 25, said device including polymerized column spacers formed from the precipitated and cured resin wherein said partially modified surface state of the surface of said orienting means provides the site for the precipitation of the resin and polymerized column spacers.

30. A method for fabricating a liquid crystal electro-optical device, the method comprising the steps of:

forming a sealing material on a peripheral portion of a first substrate having a surface;

placing a mixture of a liquid crystal material and an uncured resin on the surface of the first substrate;

adhering a second substrate on a surface of the first substrate onto which the mixture is placed;

precipitating the uncured resin from the mixture; and curing the sealing material and the precipitated uncured resin to form polymerized spacers, wherein said uncured resin is precipitated at regular spacing along both a transverse and longitudinal direction within said liquid crystal material.

* * * * *